July 5, 1938. J. W. McFARLAND 2,122,618
MECHANICAL DEVICE FOR OPENING MILK CANS
Filed July 6, 1937

Inventor
John W. McFarland
By Frank S. Ankleman
Attorney.

Patented July 5, 1938

2,122,618

UNITED STATES PATENT OFFICE 2,122,618

MECHANICAL DEVICE FOR OPENING MILK CANS

John W. McFarland, St. Anthony, Idaho, assignor to Easy Lift Lid Company, a corporation of Utah Application July 6, 1937, Serial No. 152,239

4 Claims. (Cl. 220—43)

This invention relates to milk can covers, and means for manipulating the said covers to facilitate their removal.

It is an object of this invention to provide novel means associated with a milk can cover effective to apply leverage to dislodge the cover during the manipulation of a handle associated therewith.

It is furthermore an object to provide novel means for protecting the hand of an operator during the manipulation of the mechanism.

With the foregoing and other objects in view, the invention consists in the details of construction, and in the arrangement and combination of parts to be hereinafter more fully set forth and claimed.

In describing the invention in detail, reference will be had to the accompanying drawing forming part of this application wherein like characters denote corresponding parts in the several views, and in which—

Figure 1:
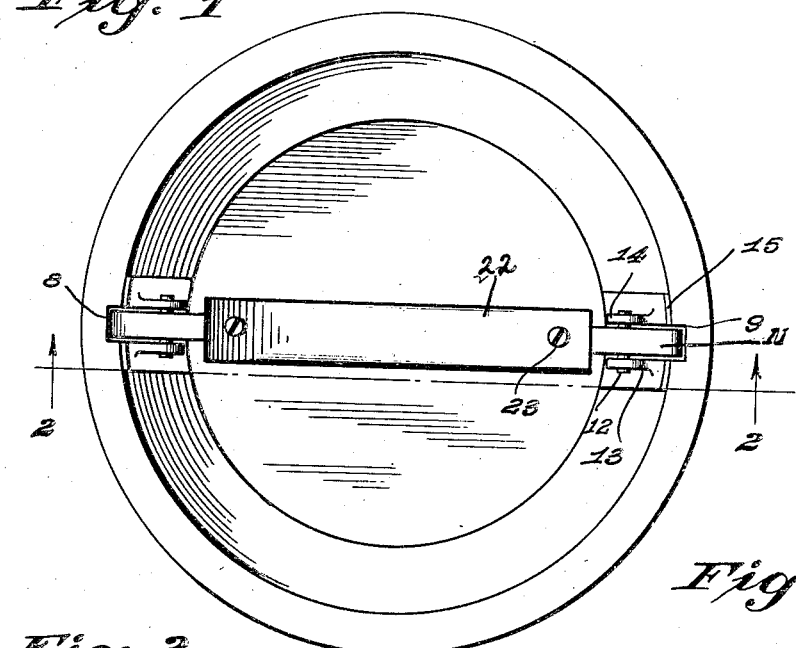
Figure 1 illustrates a plan view of a milk can cover with a device embodying the invention installed.

In the drawing 5 denotes a milk can having the flange 6 at the mouth thereof, and 7 denotes the can lid or closure. Near the top of the closure, the side wall thereof is provided with two slots 8 and 9 which receive the ends of levers 10 and 11, respectively. Each lever is mounted on a pivot 12 held by lugs 13 and 14 projecting from a plate 15 suitably secured on the surface of the cover, and the relation of parts is such that the outer end of each lever coacts with the flange 6 of the milk can when the handle is manipulated, as will presently appear, it being shown that the lower surface or edge 16 of each lever is curved to form a cam surface which will coact with the flange of the milk can.

Figure 2:
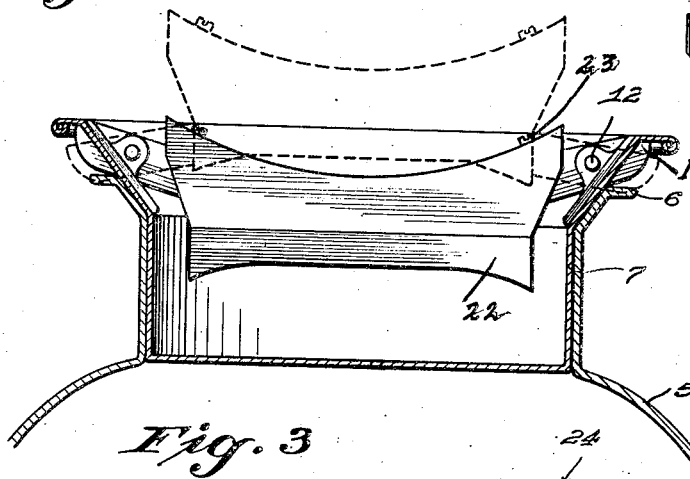
Figure 2 illustrates a sectional view of a fragment of a can with the lid manipulating means in elevation, the can cover being in section.
Figure 4:
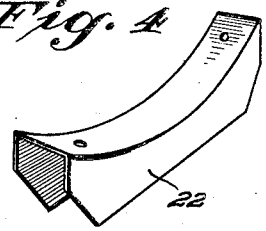
Figure 4 illustrates a perspective view of a shield for the handle.
Figure 3:
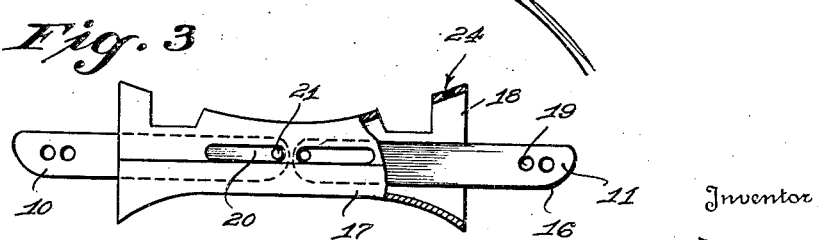
Figure 3 illustrates a detail view of the handle and parts associated therewith.

The handle 17, in the present embodiment of the invention, is hollow and is flared at each end as shown at 18 to provide for the oscillatory movement of the levers, each of which may have one or more apertures 19 for the reception of the pivot 12 so that an adjustment may be provided, if desired. The handle is provided with a slot or plurality of slots 20 in which a cross pin 21 of each lever is permitted to move during the manipulation of the handle, it being noted from an inspection of Fig. 2 that when the handle is raised to the dotted line position, the levers will assume the dotted line positions in contact with the flange of the can and this action will result in prying the lid loose if it has a tendency to "stick".

To guard against injury of the hand of the manipulator, a shield 22 is applied to the handle and it extends over the sides thereof and thus obscures the pivot 21 and the slot in which it is movable. The shield is held in place by fastenings such as screws 23, each of which is anchored in the threaded apertures 24 of the handle.

It will be noted that the assembly results in the production of a compound lever extending each way from the approximate center of the lid and through openings in the lid and that the rounded or camming end of the levers will contact and press the lid upward at each end as the handle is lifted.

It has been found that a device made in accordance with the invention is efficient and satisfactory in use and that it is comparatively inexpensive to manufacture and maintain.

I claim:

1. An attachment for can closures, a closure having approximately diametrically opposite apertures in its side, a lever projecting through each aperture, means for pivotally mounting each lever, a handle comprising a tubular member slotted longitudinally, pins extending transversely at the inner ends of the levers into said slot and slidable therein as the handle is raised and lowered for moving the outer ends of the levers in contact with the top of a container in which the closure is seated.

2. In a closure for receptacles, levers pivotally mounted transversely of the closure and projecting at the sides thereof, the projecting portions being operative to engage a portion of the container to which the closure is applied, a longitudinally slotted handle, transversely disposed pins in the inner ends of the levers operating in the slotted portion of the handle and imparting oscillatory movement to the levers as the said handle is moved axially of the container whereby the movement of the handle forces the outer ends of the levers into engagement with the container for dislodging the said closure.

3. In a closure for receptacles, levers pivotally mounted transversely of the closure and projecting at the sides thereof, the projecting portions being operative to engage a portion of the container to which the closure is applied, a longitudinally slotted hollow handle, transversely disposed pins in the inner ends of the levers operating in the slotted portion of the handle and imparting oscillatory movement to the levers as the said handle is moved axially of the container whereby the movement of the handle forces the outer ends of the levers into engagement with the container for dislodging the said closure.

4. In a closure for receptacles, levers pivotally mounted transversely of the closure and projecting at the sides thereof, the projecting portions being operative to engage a portion of the container to which the closure is applied, a longitudinally slotted hollow handle, transversely disposed pins in the inner ends of the levers operating in the slotted portion of the handle and imparting oscillatory movement to the levers as the said handle is moved axially of the container whereby the movement of the handle forces the outer ends of the levers into engagement with the container for dislodging the said closure, and a shield covering the handle.

JOHN W. McFARLAND.